United States Patent [19]

Okabayashi

[11] Patent Number: 4,870,521
[45] Date of Patent: Sep. 26, 1989

[54] FLOATING MAGNETIC HEAD

[75] Inventor: Yoshikatsu Okabayashi, Kokubu, Japan

[73] Assignee: Kyocera Corporation, Kyoto, Japan

[21] Appl. No.: 210,756

[22] Filed: Jun. 23, 1988

[51] Int. Cl.$^4$ ............................................. G11B 5/60
[52] U.S. Cl. .................................................... 360/103
[58] Field of Search ........................................ 360/103

[56] References Cited

U.S. PATENT DOCUMENTS

| 4,658,314 | 4/1987 | Sasazaki | 360/103 |
| 4,709,284 | 11/1987 | Endo et al. | 360/103 |
| 4,805,059 | 2/1989 | Tsuchiya et al. | 360/103 |

Primary Examiner—Robert S. Tupper
Attorney, Agent, or Firm—Spensley Horn Jubas & Lubitz

[57] ABSTRACT

A floating magnetic head having a reinforcing section at a partial area of a coil accommodation groove to increase the flatness accuracy of the air bearing surface of the head and to prevent the air bearing surface from warping when the air bearing surface is flattened.

7 Claims, 3 Drawing Sheets

FLOATING MAGNETIC HEAD

BACKGROUND OF THE INVENTION

1. Field of the Invention

The present invention relates to a floating magnetic head, more particularly, a floating magnetic head having an excellently flat air bearing surface.

2. Prior Art

It is well known that a floating magnetic read/write head for a magnetic disk drive floats due to air flow over the surface of a magnetic disk during disk rotation, and read and write data.

FIG. 7 shows an example of a conventional floating magnetic head. A floating magnetic head 1' is basically composed of a slider 2' made of ceramic or the like, a magnetic core 3' and a coil (not shown in FIG. 7).

Two parallel rails 4' and 5' are provided on the surface (facing a magnetic disk) of the slider 2' and extends in the longitudinal direction of the head 1'. Flat sections 6a' and tapered sections 6b' are formed on the surfaces of the rails 4' and 5'. With this structure, an air bearing surface (hereafter referred to as "ABS surface" and shown in FIGS. 1 and 7 only) is formed so that the floating magnetic head 1' floats due to air flow generated by rotation of a magnetic disk. In addition, the slider 2' has various grooves. An air flow groove (bleed slot) 7' is disposed on the head surface which faces the magnetic disk. A suspension groove 8' is disposed at the bottom of the slider 2' to accommodate a spring load application device such as gimbals for example. A coil accommodation groove 9' is disposed on the side of the slider 2'. In addition, a core accommodation groove 10' is disposed to accommodate the magnetic core 3'. The magnetic core 3' has a magnetic gap 11' formed by attaching a pair of bars made of ferrite for example. The magnetic core 3' is installed and secured in the groove 10' using glass for example so that the magnetic gap 11' is exposed to the ABS surface. A coil is formed around the secured magnetic core 3' in the coil accommodation groove 9'. These days, the magnetic head is requested to be made smaller to meet the needs for miniaturization of magnetic disk drives and high-density recording.

In particular, the floating height of the magnetic head is requested to be smaller. To meet these needs, the ABS surface of the magnetic head should be finished more accurately and have higher flatness. Since the floating magnetic head shown in FIG. 7 has a plurality of grooves as described above, the slider 2' is not strong enough. The ABS surface is apt to warp when the surface is subjected to a final flattening process (lapping). As a result, the flatness of the ABS surface is reduced. In particular, the upper groove wall 12' formed to dispose the groove 9' is thin and weak. On the side of the rail where the core 3' is disposed, the upper groove wall 12' is reinforced by the core 3' and the ABS surface has a high flatness. On the side of the other rail, the upper groove wall 12' has a cantilever form and is apt to warp. Therefore, the ABS surface near the cantilever-shaped groove wall has a less flatness due to warp.

SUMMARY OF THE INVENTION

After carefully studying the above problem, the inventor of the present invention found that the above-mentioned warp of the ABS surface was able to be sufficiently prevented by providing a reinforcing section to the coil accommodation groove, in particular, by integrating the reinforcing section with the slider and that the flatness of the ABS surface was able to be improved.

The present invention will be detailed referring to FIGS. 1 to 6.

BRIEF DESCRIPTION OF THE DRAWINGS

The magnetic heads shown in FIGS. 1 to 7 are turned upside down from their normal use conditions for convenience of explanation.

DETAILED DESCRIPTION OF THE INVENTION

Figure 1:
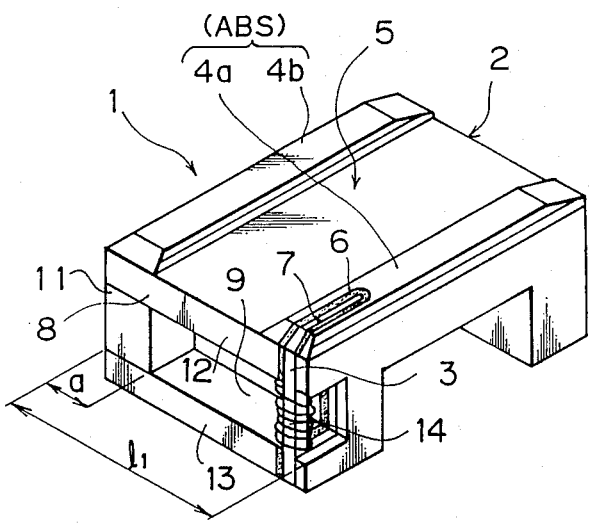
FIG. 1 is a perspective view of an embodiment of a floating magnetic head of the present invention applied to a mini-size magnetic head.
Figure 2:
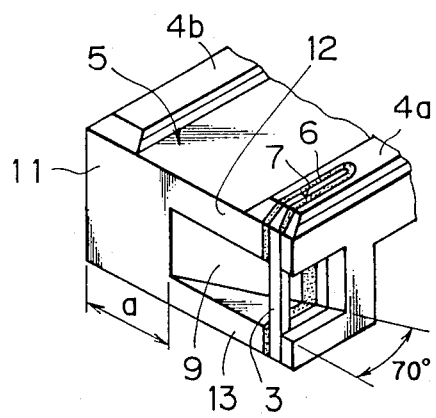
FIGS. 2 and 3 are perspective views of the coil accommodation grooves of other embodiments of the floating magnetic head shown in FIG. 1.
Figure 3:
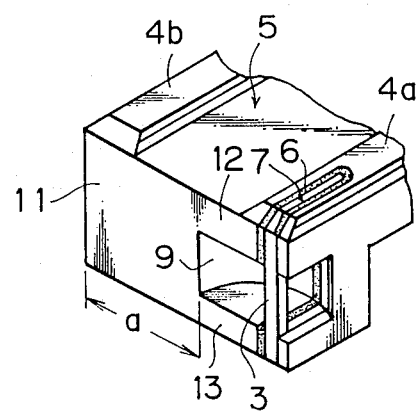

FIGS. 1, 2 and 3 show mini-size application examples of the floating magnetic head of the present invention. In the FIGS., numeral 1 designates a floating magnetic head, numeral 2 designates a slider and numeral 3 designates a magnetic core. On the surface of the slider 2 facing a magnetic recording medium, such as a magnetic disk, two rails 4a and 4b are disposed and an air flow groove 5 is formed to provide a rail-like ABS surface. At the trailing edge (air outflow side) of the rail 4a, a magnetic core accommodation groove 6 is disposed to accommodate the magnetic core 3. In the magnetic core accommodation groove 6, the magnetic core 3 is secured to the groove 6 using adhesive, such as glass, so that the magnetic gap 7 of the magnetic core is exposed above the top surface of the rail 4a. On the side surface 8 of the air outflow side of the slider 2, a coil accommodation groove 9 is disposed perpendicular to the magnetic core accommodation groove 6. A coil 14 (not shown in FIGS. 2 to 6) is formed around the leg of the magnetic core 3 in the coil accommodation groove 9.

The present invention features a reinforcing section 11 disposed on the side of the rail in which the magnetic core 3 inside the coil accommodation groove 9 is not installed. With this reinforcing section (beam) 11, an upper groove wall 12 does not have a cantilever form. This reinforcing section 11 can thus effectively prevent the ABS surface from warping during lapping.

The reinforcing section 11 is formed as described below. As shown in FIG. 1, the reinforcing section 11 is fitted into the predetermined position in the coil accommodation groove 9 before the ABS surface is finally flattened. Or as shown in FIGS. 2 and 3, the upper and lower groove walls 12 and 13 are integrated with each other on the side opposite to the magnetic core 3. More particularly, the coil accommodation groove 9 is formed in a partial area of the air outflow side of the slider 2. The coil accommodation groove 9 has a shape of a rectangular in plan view (including the leg of the magnetic core 3.) Or the coil accommodation groove 9 has a shape of a right-angled triangular or a bow as shown in FIG. 2 or FIG. 3. The ratio between width a of the reinforcing section 11 on the slider side and the entire width $l_1$ of the slider 2 should be between 0.03 and 0.8. If the ratio is smaller than 0.03, the reinforcing effect of the reinforcing section 11 is lost and the reinforcing section 11 is apt to be broken when the groove 9 is formed by machining. If the ratio exceeds 0.8, it is difficult to wind coil wires.

Figure 4:
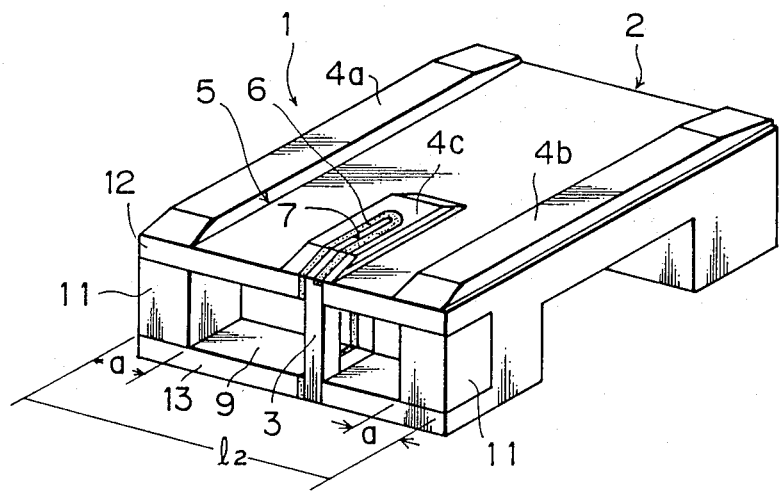
FIG. 4 is a perspective view of another embodiment of a floating magnetic head of the present invention applied to a full-size magnetic head.
Figure 5:
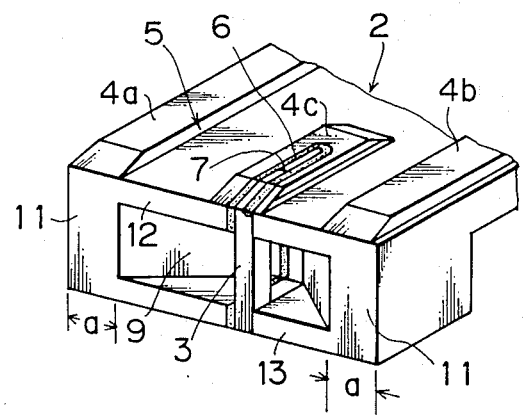
FIGS. 5 and 6 are perspective views of the coil accommodation grooves of other embodiments of the floating magnetic head shown in FIG. 4.
Figure 6:
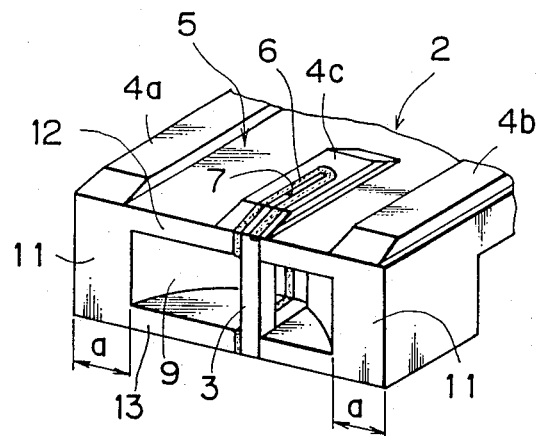

FIG. 4 shows a full-size type of another embodiment of the present invention. Like parts in FIGS. 1 and 4 are identified by the same reference numerals. Referring to FIG. 4, on the surface of a slider 2, three rails 4a, 4b and 4c are disposed parallel to one another. A magnetic core accommodation groove 6 is disposed at the trailing end of the center rail 4c. On the side surface of the air outflow side of the slider 2, a coil accommodation groove 9 is disposed. With this embodiment, a reinforcing section 11 is disposed at the positions corresponding to the trailing ends of the rails 4a and 4b. Like the minisize type, reinforcing beams 11, 11 are fitted into the groove 9 as shown in FIG. 4. Or as shown in FIGS. 5 and 6, upper and lower groove walls 12 and 13 are integrated with each other on both sides of the trailing end of the head. When integrated, the reinforcing sections of a rectangular shape in plan view; as shown in FIG. 4 of a right-angled, triangular shape as shown in FIG. 5 or of a bow shape as shown in FIG. 6 is disposed on both sides of the magnetic core accommodation groove 6. The ratio between width a of one of the reinforcing sections 11 and the entire width $l_2$ of the slider 2 should be between 0.025 and 0.35.

The magnetic head of the present invention is made as follows. As described above, the magnetic core 3, made of a pair of magnet (ferrite) pieces joined to each other and having the desired groove between the pieces to form the magnetic gap 7, is inserted into the core and the groove 6. Glass is filled between the core 3 and the groove 6 to secure the core 3 to the slider 2.

When not integrated with the slider 2, the reinforcing section 11 is fitted into the groove 9 and the ABS surface is flattened by lapping. The head is thus finished. When this magnetic head is installed in a magnetic head unit, a coil 14 is formed around the magnetic core 3. A spring load application device, such as gimbals, is installed on the back of the ABS surface of the slider 2. The head is installed on a head arm via this application device. In the description of the present invention, the reinforcing section is installed near a rail away from the magnetic core 3. However, the reinforcing section 11 can also be disposed at a proper position in the coil accommodation groove 9 to keep the overall pressure balance during grinding of the ABS surface of the magnetic head.

Figure 7:
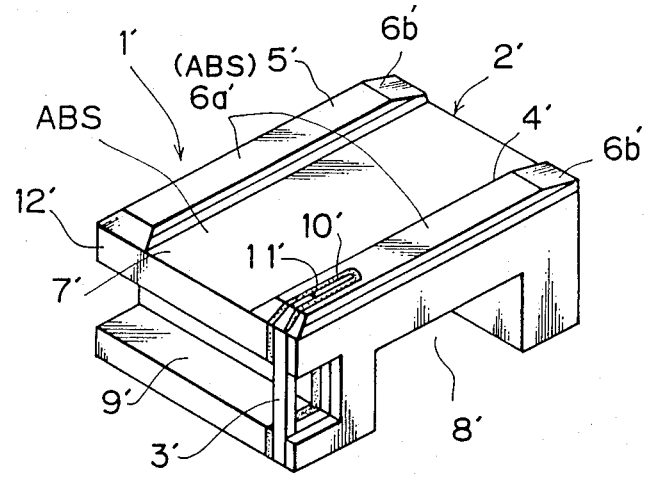
FIG. 7 is a perspective view of a conventional floating magnetic head.

The flatness machinability of the floating magnetic head of the present invention was compared with that of the conventional floating magnetic head using the slider made of calcium titanate and the magnetic core made of Mn-Zn ferrite. The conventional magnetic head shown in FIG. 7 and the magnetic head of the present invention shown in FIG. 2 were used for comparison. With the cores of both heads attached using glass, the ABS surfaces of both heads were lapped to obtain the standard flatness values of $5\mu$, $4\mu$ and $3\mu$. For each flatness standard value of each type, 100 samples were made. The acceptance percentage values for these classified items are listed in Table 1.

TABLE 1

| Standard | $5\mu$ | $4\mu$ | $3\mu$ |
|---|---|---|---|
| Conventional head | 98% | 90% | 75% |
| Head of present invention | 100% | 100% | 100% |

Table 1 clearly indicates that the flatness machinability of the floating magnetic head of the present invention is superior to that of the conventional head in all the items.

As detailed above, with the floating magnetic head of the present invention, the flatness accuracy of the ABS surface is maintained by installing a reinforcing section (or sections) in a partial area of the coil accommodation groove of the slider, and superior flatness machinability can be obtained. As a result, the present invention can provide magnetic disk drives capable of meeting the needs for miniaturization and high-density recording.

I claim:

1. A floating magnetic head comprising:
   a slider which includes a plurality of rails to define an air bearing surface on a surface facing a magnetic recording medium, a magnetic core accommodation groove disposed at the trailing end of one of said rails, and a coil accommodation groove disposed at the trailing end of said slider nearly perpendicular to said magnetic core accommodation groove,
   a magnetic core whose magnetic gap is disposed in said magnetic core accommodation groove so that said gap is exposed above the top surface of said rail corresponding to said slider, and
   a coil on said magnetic core,
   said floating magnetic head being characterized in the said coil accommodation groove further comprises a reinforcing section at least at one end of said groove, opposite to said magnetic core, so as to prevent a possible deflection of said air bearing surface when said air bearing surface is subject to flattening.

2. A floating magnetic head according to claim 1, wherein said reinforcing section is a reinforcing beam fitted into said coil accommodation groove at the wall end of said groove, opposite to said magnetic core.

3. A floating magnetic head according to claim 1, wherein said reinforcing section is a reinforcing connection section integrated with the upper and lower walls of said coil accommodation groove, at one end opposite to said magnetic core.

4. A floating magnetic head according to claim 3 wherein said coil accommodation groove connected to said connection section has a right-angled triangular shape in plan view.

5. A floating magnetic head according to claim 4, wherein said coil accommodation grove connected to said connection section has a bow shape in plan view.

6. A floating magnetic head according to any of claims 2 through 5, wherein three rails are disposed, said magnetic core accommodation groove is disposed at the trailing end of the center rail, and said coil accommodation grooves are disposed at the right and left of said magnetic core installed in said magnetic core accommodation groove to provide said reinforcing sections at said right and left positions, one at a position.

7. A floating magnetic head according to claim 1, wherein the ratio of the width of said reinforcing section to the overall width of said slider is between 0.03 and 0.8.

* * * * *